Jan. 12, 1943.  W. W. MACFARREN  2,308,090
VARIABLE SPEED FRICTION TRANSMISSION
Filed Oct. 25, 1939

INVENTOR.
Walter W. Macfarren

Patented Jan. 12, 1943

2,308,090

UNITED STATES PATENT OFFICE 2,308,090

VARIABLE SPEED FRICTION TRANSMISSION

Walter W. Macfarren, Los Angeles, Calif.

Application October 25, 1939, Serial No. 301,271

8 Claims. (Cl. 74—190)

My invention relates to variable speed power transmissions of the frictional driving type, and more particularly to one in which a resilient pulley drives or is driven by a non-resilient wheel, in such a manner that the working radius of the pulley may be varied within limits to vary the speed of the driven member.

The objects of the invention are:

1. To produce a transmission which may be designed to transmit either small or large powers, say from one H. P. to 200 H. P. or more with appropriate design.

2. To provide a transmission which may produce either a large or small variation of speed, by small increments, over its entire range of speed.

3. To produce a transmission in which there is practically no uneven slippage to cause wear, and one in which the frictional contacts are large and efficient for the transmission of power.

4. To use a pneumatic rubber tire, or a plurality of the same, as power transmitting elements.

5. To use a pair of pneumatic tires as power transmitting members between the initial and final shafts, these members being compounded or used in series with each other to increase the speed variation.

6. To use a pneumatic tire of ordinary form, in driving contact with an internal friction wheel, to extend the contact surface, and to make the assembly compact.

7. To provide means for varying the working radii of the pneumatic pulleys, and power operated means for large tranmissions; and means for controlling said power operated means from a distance if desired, or automatically.

8. To combine the speed change obtained by varying the working radii of the tire pulleys, with a stepped gear reduction, in such a manner as to extend the total speed change over a wide range.

9. To provide special gripping surfaces on the metal wheels to engage the pneumatic pulleys.

10. And in general to provide an efficient, powerful, durable, reliable, and economical variable speed power transmission, for use wherever such a device is needed. To these ends my improved transmission comprises the various parts as shown in the appended drawing, in which.

In a road wheel equipped with a pneumatic tire the load on the wheel is measured by the product of the flattened area of the tire which bears upon the ground, and the unit air pressure in the tire. This bearing area of the tire changes automatically with a variation of either the load or the air pressure.

Since the contact between the tire and the road is frictional, all the power required to drive the vehicle on a level and to lift it up grades, is transmitted through this frictional contact. The more the tire is flattened or depressed by the wheel load, the less becomes the distance from the axle to the road, and the less becomes the working radius of the tire. A tire having a working radius of 15″ when lightly loaded, has a working radius of 13½″ when the load is increased to cause a further depression of 1½″. In this case the working radius of the tire has been decreased 10%, and the speed of the wheel, and of the vehicle driven thereby, will also be reduced 10% at the same engine speed.

If now the wheel was mounted on a stationary shaft, and made to drive a moving frictional member resting on top of it, in the same manner as a pinion drives a rack, the conditions as to speed would be the same, that is, with a constant wheel speed, the travel of the rack member would vary as the working radius of the wheel or tire was changed. A construction employing similar principles, and used as a feeding device for sheet material, is shown in my Patent No. 2,227,789, issued January 7, 1942.

Figure 3:
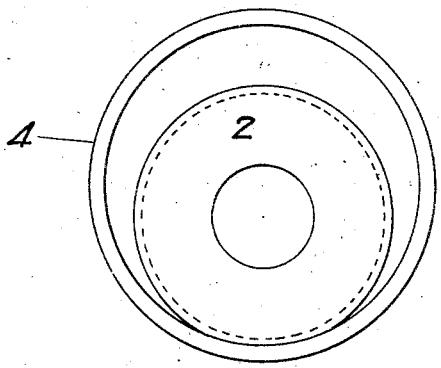
Fig. 3 is a diagram showing a pneumatic pulley in contact with an internal metal pulley, and at its maximum working radius.
Figure 4:
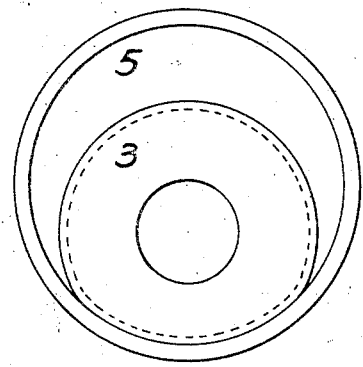
Fig. 4 is a similar view at the minimum working radius of the pneumatic pulley.

Referring now to Figs. 3 and 4, the conditions are similar, but instead of driving a rack, the pneumatic pulleys 2 or 3 may drive, or be driven by, one of the rigid internal friction pulleys 4, or 5.

Fig. 3 shows a pneumatic pulley 2, of say 16½″ normal unloaded diameter, engaging an internal pulley 4 of say 20″ diameter or bore, and with an initial depression of say ¼″, to obtain the necessary driving contact and pressure. This pressure is of course, supplied by the air in the tire, and the maximum working radius is say 8″.

It will be noted that when such a pneumatic pulley drives, or is driven by such an internal pulley the conditions of contact are favorable, that is, there is a greater area of contact than with a road wheel operating on a plane surface, and still more than with a pneumatic pulley contacting a cylindrical surface externally. Thus the required air pressure to maintain driving contact will be less, and the pneumatic pulley may be of lighter construction.

Fig. 4 shows the centers of the pneumatic pulley 3, and the internal pulley 5, which may be duplilcates respectively of the pulleys 2 and 4, drawn together 1" with respect to their position as shown in Fig. 3, thus decreasing the working radius of the pneumatic pulley 2 or 3, from 8" to 7". This change of the working radii of the pulleys 2 or 3, or of both of them, is the crux of the present invention, as it is by this change of working radius that all the speed variations are effected.

Figure 5:
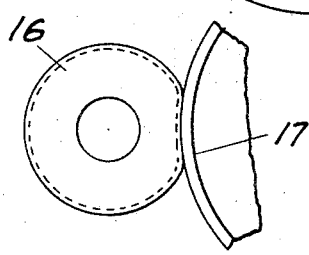
Fig. 5 is a similar diagram showing a pneumatic pulley operating in external contact with a cylindrical metal pulley.

Fig. 5 shows a pneumatic pulley 16 in external contact with a cylindrical pulley 17, and illustrates that while such an arrangement may be successfully used, the change of direction of the outer portion or tread of the pneumatic pulley in making and breaking contact with the rim of the cylindrical pulley 17 as it rotates, is more abrupt, and less gradual than the corresponding action shown in Figs. 3 and 4.

Figure 1:
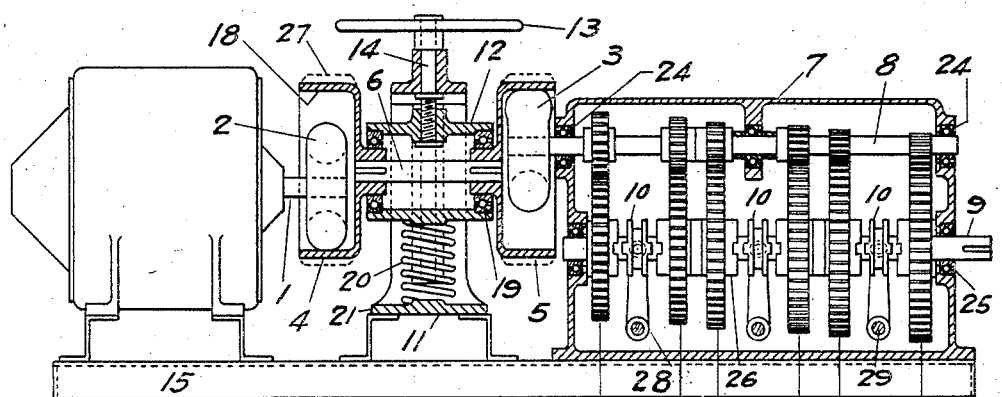
Fig. 1 is a vertical longitudinal section of a normal preferred form of the machine.
Figure 2:
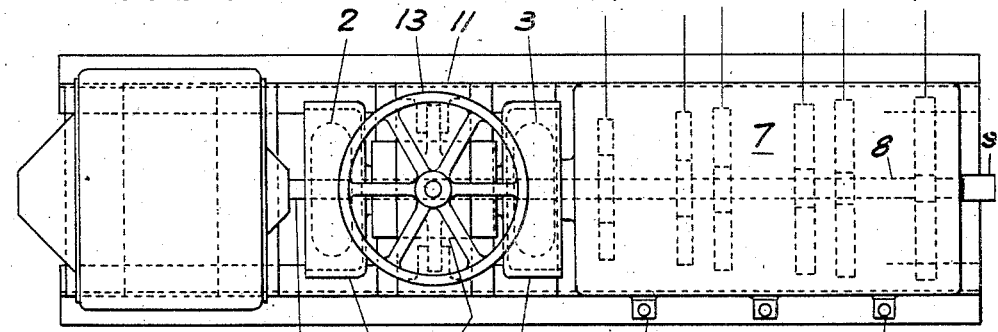
Fig. 2 is a plan view of the same.

Referring now to Figs. 1 and 2, a driving pneumatic pulley 2 is mounted on a drive shaft 1, which may be a shaft forming part of any type of machine, or which may be the shaft of a synchronous or other type of constant speed motor, or which may be a shaft forming part of the transmission assembly.

The pulley 2 contacts the internal surface 18 of the internal pulley 4. The outer surface of the pneumatic pulley 2 may be smooth, or have any of the various designs or projections usually applied to pneumatic tires. Also the contacting surface 18, of the pulley 4, may have depressions or ridges, or any form of surface adapted to increase driving power, or it also may be smooth.

The internal pulley 4 is mounted on a short shaft 6, which has a similar internal pulley 5 mounted on its opposite end. As shown, the internal pulleys 4 and 5 are duplicates, but this is not a necessary condition. The shaft 6 is mounted in bearings 19, which are preferably antifriction bearings, and which are set in a vertically sliding member 12, the same having a vertical motion of about 1" in the design shown in Fig. 1, in a stand or guiding member 11, which is secured to the base frame 15. A helical spring 20 may be set between the slide 12 and the base flange 21 of the stand 11, to counterbalance the former and its attached parts. An adjusting screw 14, having a hand wheel 13, is rotatably fixed to the top of the stand 11, and actuates the slide 12 up or down to change the working radii of the pulleys 2 and 3.

The extent of this motion is limited both up and down by the collars shown on the adjusting screw 14.

The internal pulleys 4 and 5, being both fixed to the shaft 6, are in effect a single unit. The internal pulley 5 engages the pneumatic pulley 3 to drive the same, and the pulley 3, as shown in Fig. 1, is in a position to be engaged at its minimum working radius, when the driving pneumatic pulley 2 has its maximum working radius in action. In this position of the pneumatic pulleys 2 and 3, the parts driven by the pulley 3 attain their maximum speeds.

When the slide 12 is adjusted upwardly, carrying with it the shaft 6, and the internal pulleys 4 and 5, the working radius of the pneumatic pulley 2 is decreased, thus slowing down shaft 6, while the working radius of pneumatic pulley 3 is increased, thus again slowing down the parts driven by pulley 3.

The speed variations induced by a change of radius of the pneumatic pulleys 2 and 3, is thus compounded by a simultaneous adjustment of the internal pulleys 4 and 5.

It will be noted that whether they are adjusted separately or simultaneously, the same change of speed is produced on the final shaft if the adjustments in both cases are the same in amount and direction. Or, if two separate adjustments are used, either of them may be used for its full range before using the other.

Since the screw adjustment of the slide 12 may be made as fine as desired, any desired speed change may be made, and with fine gradations of speed. It is also pointed out that for any given setting of the slide 12, no variation of speed is possible except that caused by slippage under an overload.

The accuracy of the speed ratio between the driving shaft 1, and the driven shaft 8, or the frictionally connected shafts, depends solely on the accuracy of the contact faces 18, of the internal pulleys 4 and 5. If these are truly round, and run true on the shaft 6, the speed ratio will be exact and constant. Variations in the resilient pneumatic pulleys 2 and 3 will not affect this ratio.

The present invention may be built and used with only the parts so far described; or in other words, the whole speed change between the driving shaft 1, and the driven shaft 8, may be obtained solely by the action of the two pneumatic pulleys 2 and 3, and the two internal pulleys 4 and 5.

For general use however, it is desirable to combine with the frictional elements previously described, a gear box containing from two to six or more pairs of change speed gears, and to so design the ratio of each pair of gears that they will be proportioned in steps forming a geometrical progression, and further that these steps shall be of such an order that the variations of speed produced by the variable radius pneumatic pulleys 2 and 3, will bridge the gaps in speed between the gears, thus allowing any speed from the maximum to the minimum to be given to the driven shaft 9.

To accomplish this result I provide a gear box 7, secured to the base frame 15, and supporting the driven shaft 8, and a final shaft 9, driven thereby. The shaft 8 is mounted in suitable bearings 24, and the shaft 9 in similar bearings 25, all of these being preferably ball or roller bearings.

Upon the shafts 8 and 9, there are mounted six pairs of reduction gears A, B, C, D, E, and F, as shown in Fig. 1. The gears on shaft 8 are all rigidly secured to or integral with this shaft, and the gears on shaft 9 are all loosely mounted on this shaft, and each is provided with a clutch hub 26, which may be engaged by a jaw clutch 10 mounted on a feather key in the shaft 9. As shown there may be three double jaw clutches 10, each operated by a shifter 28, mounted on a shaft 29, for operation by a hand lever 30, outside of the gear box 7.

The speed relations for a typical transmission between the motor or drive shaft 1, and the various power transmitting elements, including the final shaft 9, may be as shown in the following table, in which the motor speed is assumed, and the other speeds are approximate, and used for illustration only. The speed of shaft 1 is assumed as 1750 R. P. M. and the internal diameter of pulleys 4 and 5 as 20". This table shows that the speed change due to variations of the working radii of the pneumatic pulleys 2 and 3 only, is from 2000 to 1530 R. P. M., or a reduction of 23½%, and that in combination with the six pairs of gears A, B, C, D, E, and F, the overall speed reduction for shaft 9, is from 1000 to 200 R. P. M. or a total speed change ratio of five to one.

| Working radius of pneu. pulley 2 | R. P. M. of int. pulley 4 and 5 | Working radius of pneu. pulley 3 | R. P. M. of pneu. pulley 3 | R. P. M. of final shaft 9 | | | | | |
|---|---|---|---|---|---|---|---|---|---|
| | | | | Grs. A, ratio 1 to 2 | Grs. B, ratio 1 to 2.6 | Grs. C, ratio 1 to 3.4 | Grs. D, ratio 1 to 4.5 | Grs. E, ratio 1 to 5.8 | Grs. F, ratio 1 to 7.6 |
| 8" | 1,400 | 7" | 2,000 | 1,000 | 765 | 586 | 448 | 342 | 262 |
| 7½" | 1,310 | 7½" | 1,750 | 875 | 670 | 513 | 392 | 300 | 230 |
| 7" | 1,225 | 8" | 1,530 | 765 | 586 | 448 | 342 | 262 | 200 |

It will be obvious that additional pairs of reduction gears, similarly proportioned, may be incorporated in the design, so that the overall speed range of the transmission may be made practically anything desired. It will also be noted that if a lesser speed range is sufficient for the desired purpose, the omission of the gears A will reduce the speed range from 765 to 200 R. P. M., or a range of 3.82 to 1, and further that the omission of both the gears A and the gears F will give a speed range for the final shaft 9, of from 765 to 262 R. P. M., or an overall range of 2.92 to 1.

It will be further noted that the power and efficiency of the transmission are practically the same throughout its whole range of speed, although of course the torque of the shaft 9 is correspondingly increased at the lower speeds. It will also be noted that while I have described the device as being adapted to reduce the speed of the high speed driving shaft 1, to various lower speeds for the final shaft 9, the device is equally well adapted to receive power at the shaft 9, and transmit the same at a series of higher speeds to the shaft 1.

We now come to consider the amount of power which may be transmitted by the drive just described. It is common knowledge that a medium size pneumatic tired automobile, weighing with its contained passengers about 4000 lbs. may be driven up a 25% grade on a moderately smooth hard road. To do this requires a tractive effort of 1000 lbs., or 500 lbs. push on each rear wheel. Assuming 50 lbs. of air pressure in the tires, for a 1000 lb. load on each wheel, the bearing area of each driving wheel on the ground would be about 20 square inches. Thus each square inch of rubber in contact with the ground will produce 25 lbs. of push or traction, or stated another way the coefficient of friction of a good rubber pneumatic tire on a fairly good road surface is at least 50%.

Assuming that an equal driving effect could be obtained in the machine of the present invention, then if the 5" tires of the pneumatic pulleys 2 and 3, had a little over 13 square inches of contact with the internal pulleys 4 and 5, they could transmit 330 lbs. of traction with 50 lbs. of contained air pressure.

One horse power equals 33,000 foot lbs. per minute. Therefore the pneumatic pulley 2 could transmit one H. P. @ 100 ft. per min. surface travel, or 10 H. P. per 1000 ft. per min., or 50 H. P. @ 5000 ft. per min. A racing automobile has traveled over 300 miles per hour, or over 5 miles per minute, or over 26,000 feet per minute. Stock cars travel over 100 miles per hour or over 9,000 ft. per min. on pneumatic tires.

The limiting speeds for these transmissions will probably be imposed not by the rubber pneumatic tire members, but by the metal parts. Assuming 5000 ft. per min. as a reasonable speed for the pneumatic pulleys 2 and 3, the transmission shown in Figs. 1 and 2, with 5" tires and 50 lbs. of air pressure could handle 50 H. P. and with 100 lbs. of air, 100 H. P.

The speed table on page 9 is based on the assumption that the speed ratio between the pneumatic pulley 2, and the coacting internal pulley 4, is directly proportional to the working radius of the pneumatic pulley, just as it would be if the pneumatic pulley 2 was a rigid pulley of that radius. If this is not strictly true, the only effect of a departure from the above assumption would be to change the various speeds of the shaft 8 to either higher or lower values. In this event a further adjustment of the slide 12 in one direction or the other will correct these speeds, or if the final speeds are either generally higher or generally lower throughout the range of final speeds, this will make no essential difference in the practicability of the device, and can be compensated for in the final drive.

In other words, the first transmission built of the type shown in Figs. 1 and 2, will give accurate data on all speeds, for all future transmissions built of that type and size. It will be noted that in the above type of transmission, the speeds of the contacting surfaces of the pneumatic pulleys 2 and 3, which are in working contact with the internal pulleys 4 and 5, are always equal, irrespective of the difference in the working radii of the two pulleys 2 and 3.

To recapitulate:

1. This transmission is adaptable to either small or large powers, with proper design.
2. Pneumatic tires are generally available in a large variety of sizes, and special sizes may be readily obtained. Such tires have been intensively developed to a high state of mechanical perfection, their capabilities are known and their cost is moderate.
3. Rubber is an ideal material to afford traction, or to grip a moving surface, and its durability under rough usage is proved.
4. The design of the present transmission offers a superior smooth track, with no bumps and no possibility of skidding, which should greatly increase the durability of the pneumatic pulleys over that obtained in road service.
5. The driving contact of the pneumatic pulleys is large, thus reducing the necessary pressure between the driving and the driven shafts, as compared to other frictional transmissions having only a line contact for driving.

6. As compared to a double (true) cone and belt transmission, the present design is superior as to the efficiency of the driving contact, in compactness, in the ability to use higher speeds, in the ability to transmit far larger powers, in the fine gradations of speed which may be obtained, and in the ability to accurately maintain a set speed.

7. As compared to a hydraulic transmission having a variable output pump and a variable input motor, this transmission is much cheaper to build, more reliable in operation, may be commercially used in much larger sizes, and is not affected by grit, leakage, or changes in temperature.

8. This transmission is well adapted for operation in dusty places such as cement mills, and is not affected by ordinary weather changes in temperature.

9. The transmission provides very fine gradations in speed, and these settings give constant speeds relative to the speed of the driving shaft. In the design of Figs. 1 and 2, it is probable that the low speeds (gears F) of the final shaft 9, may be varied in steps of 1 R. P. M. as 200, 201, 202, 203, 204, etc.

10. The pneumatic speed varying elements of the transmission are compact, and may be readily built into any ordinary machine, to connect two of its shafts for variable relative movement.

11. In the normal form of the transmission of Figs. 1 and 2, the frictional contacting elements are always operating at the higher speeds, while the elements transmitting the heavier torques are gears, operating at the lower speeds, which is conducive to the transmission of more power in less space.

12. The internal driving contact of Fig. 1 is conducive to long life of the resilient driving member 2, and increases the area of driving contact. Since depressing a pneumatic tire only slightly increases the air pressure therein, the radial adjustment of the pneumatic pulleys does not appreciably change the unit contact pressure, but merely brings more tire surface into contact.

The foregoing description will give machine designers a full understanding of the principles and advantages of my improved transmission, which combined with known or easily obtainable data, will enable those skilled in the art to produce a satisfactory machine of this type, and varied in design to suit the numerous situations in which such a device may be used.

I claim as my invention:

1. In a variable speed transmission, a shaft, a pneumatic tired pulley thereon, a second shaft, a rigid internal pulley thereon and in driving contact with said pneumatic pulley, a second internal pulley on said second shaft, a third shaft, a second pneumatic pulley on said third shaft, and in driving contact with said second internal pulley on said second shaft, rigid bearing supports for said first and third shafts, and means for varying the position of said second shaft with respect to said first and third shafts to vary the working radii of said two pneumatic pulleys simultaneously, and thus vary the relative speeds of said first and third shafts.

2. In a variable speed transmission, a shaft rotating in fixed bearings and provided with a pneumatic tired pulley, a second shaft similarly mounted, parallel to said first shaft, and provided with a pneumatic tired pulley, a unitary rotative element in parallel relation to said two shafts, and having one or more working faces adapted to contact said two pneumatic pulleys, and means for moving said rotative element in such a way as to vary the working radii of said two pneumatic pulleys, and thus vary the relative speeds of said first and second shafts.

3. In a variable speed transmission, a shaft, a pneumatic tired pulley thereon, a second shaft, a pneumatic tired pulley thereon, an intermediate rotary element in driving contact with each of said pneumatic pulleys, and means for bodily moving said rotary element with relation to both of said pneumatic pulleys, and in such a manner as to simultaneously increase the working radius of one of said pulleys and decrease the working radius of the other, thereby compounding the effect of such radii variation to vary the relative speeds of said first and second shafts.

4. In a variable speed transmission, a frame, a shaft mounted thereon, a pneumatic tired pulley on said shaft, a guide on said frame, a slide working in said guide, a shaft carried by said slide, an internal pulley on one end of said shaft and in driving contact with said pneumatic pulley, a second internal pulley on the other end of the shaft carried by said slide, a third shaft, a second pneumatic pulley on the same, and in driving contact with said second internal pulley, and means for adjusting said slide to simultaneously increase the working radius of one of said pneumatic pulleys and decrease the working radius of the other, to vary in turn the relative speeds of said first and third shafts.

5. In a variable speed transmission, a shaft, a variable radius pulley thereon, a second shaft, a rigid pulley thereon and in driving contact with said variable radius pulley, a second rigid pulley on said second shaft, a third shaft, a second variable radius pulley on said third shaft, and in driving contact with said second rigid pulley on said second shaft, rigid bearing supports for said first and third shafts, and means for varying the position of said second shaft with respect to said first and third shafts to simultaneously increase the working radius of one of said variable radius pulleys and decrease the working radius of the other of said variable radius pulleys, and thus vary the relative speeds of said first and third shafts.

6. In a variable speed transmission, a shaft rotating in fixed bearings and provided with a variable radius pulley, a second shaft similarly mounted, parallel to said first shaft, and provided with a variable radius pulley, a unitary rotative element in parallel relation to said two shafts, and having one or more working faces adapted to contact said two variable radius pulleys, and means for moving said rotative element in such a way as to simultaneously increase the working radius of one of said variable radius pulleys and decrease the working radius of the other of said variable radius pulleys, and thus vary the relative speeds of said first and second shafts.

7. In a variable speed transmission, a shaft, a variable radius pulley thereon, a second shaft, a variable radius pulley thereon, an intermediate rotary element in driving contact with each of said variable radius pulleys, and means for bodily moving said rotary element with relation to both of said variable radius pulleys, and in such a manner as to simultaneously increase the working radius of one of said pulleys and decrease the working radius of the other thereby compounding the effect of such radii variation to vary the relative speeds of said first and second shafts.

8. In a variable speed transmission, a frame, a shaft mounted thereon, a variable radius pulley on said shaft, a guide on said frame, a slide working in said guide, a shaft carried by said slide, a rigid pulley on one end of said shaft and in driving contact with said variable radius pulley, a second rigid pulley on the other end of the shaft carried by said slide, a third shaft, a second variable radius pulley on the same, and in driving contact with said second rigid pulley, and means for adjusting said slide to simultaneously increase the working radius of one of said variable radius pulleys and decrease the working radius of the other to vary in turn the relative speeds of said first and third shafts.

WALTER W. MACFARREN.